US008056282B2

(12) United States Patent
Schneidmiller (10) Patent No.: US 8,056,282 B2
(45) Date of Patent: Nov. 15, 2011

(54) INSECT TRAP WITH BEHAVIOR MODIFYING FEATURES

(75) Inventor: Rodney G. Schneidmiller, Spokane, WA (US)

(73) Assignee: Sterling International Inc., Spokane, WA (US)

(*) Notice: Subject to any disclaimer, the term of this patent is extended or adjusted under 35 U.S.C. 154(b) by 353 days.

(21) Appl. No.: 12/350,911

(22) Filed: Jan. 8, 2009

(65) Prior Publication Data

US 2009/0151227 A1   Jun. 18, 2009

Related U.S. Application Data

(63) Continuation-in-part of application No. 12/200,820, filed on Aug. 28, 2008.

(60) Provisional application No. 61/013,936, filed on Dec. 14, 2007.

(51) Int. Cl.
*A01M 1/10* (2006.01)
(52) U.S. Cl. .......................... 43/122; 43/132.1
(58) Field of Classification Search .................. 43/121, 43/107, 122, 132.1, 133
See application file for complete search history.

(56) References Cited

U.S. PATENT DOCUMENTS

| 38,277 | A | | 4/1863 | Bassett |
| 149,918 | A | | 4/1874 | Clough |
| 218,175 | A | | 8/1879 | Hollingshead |
| 418,233 | A | * | 12/1889 | Sallade ............................ 43/121 |
| 836,052 | A | | 11/1906 | Pool |
| 862,079 | A | | 7/1907 | Lenthier |
| 1,277,354 | A | * | 9/1918 | Arabian ........................... 43/121 |
| 1,544,334 | A | * | 6/1925 | Martin ............................ 43/119 |
| 3,059,373 | A | | 10/1962 | Gardner |
| 3,320,692 | A | | 5/1967 | Hellen |
| 3,885,341 | A | | 5/1975 | Kuchenbecker |
| 4,044,494 | A | | 8/1977 | Grajnert |
| 4,876,822 | A | | 10/1989 | White |
| 5,522,171 | A | | 6/1996 | Mandeville |
| 5,557,880 | A | | 9/1996 | Schneidmiller |
| 6,158,165 | A | | 12/2000 | Wilson |
| 6,289,629 | B2 | | 9/2001 | Greening |
| 6,910,298 | B2 | | 6/2005 | Schneidmiller |
| 7,412,797 | B1 | * | 8/2008 | Hiscox ............................ 43/122 |
| 2005/0028430 | A1 | | 2/2005 | Schneidmiller |

FOREIGN PATENT DOCUMENTS

JP   08-322448 A   12/1996
JP   09-252700 A   9/1997

OTHER PUBLICATIONS

International Search Report and Written Opinion dated Mar. 13, 2009, issued in corresponding PCT/US2008/074690, filed Aug. 28, 2008, 7 pages.

* cited by examiner

*Primary Examiner* — Joshua Michener
(74) *Attorney, Agent, or Firm* — Christensen O'Connor Johnson Kindness PLLC (57) ABSTRACT

An insect trap (100, 200) having an entrapment chamber (110, 210) comprising one or more compartments, a tapered guide (130, 260) extending into each compartment, and an entry structure (120, 240) providing insect access to each compartment. The tapered guides optionally include a plurality of projections defining a crown structure for discouraging insect egress from the trap. The entry structures each define a plurality of entry apertures or entryways that are physically separated such that interactions between insects at different entryways is reduced or eliminated.

19 Claims, 8 Drawing Sheets

INSECT TRAP WITH BEHAVIOR MODIFYING FEATURES

CROSS-REFERENCES TO RELATED APPLICATIONS

This application is a continuation-in-part of U.S. patent application Ser. No. 12/200,820, filed Aug. 28, 2008, which claims the benefit of U.S. Provisional Patent Application No. 61/013,936, filed Dec. 14, 2007, the disclosures of each of which are hereby expressly incorporated by reference in their entirety.

BACKGROUND

Flying insects, for example, various social wasps, including paper wasps, hornets, and yellow jackets, can be a significant nuisance and a potential hazard to people and animals engaged in outdoor activities. Such flying insects can be prevalent in rural settings and even in very well-developed residential areas. Various species of insects, flying and otherwise, are also common in agricultural settings and in other commercial processing venues, including, for example, meat packing factories, food processing facilities, and livestock ranches.

Traps for flying insects are known in the art and often have been quite successful at trapping target insects. For example, the inventor of the insect trap disclosed herein pioneered conical element hanging traps, such as the wasp traps described and claimed in U.S. Pat. No. 4,551,941, which issued on Nov. 12, 1985, to Schneidmiller, and which is hereby incorporated by reference in its entirety. Schneidmiller discloses a transparent cylindrical insect trap that is selective to entrapping wasps. A "wasp" is a generic name applied to insects of the order Hymenoptera, which includes particularly paper wasps, hornets and yellow jackets. The present inventor also discloses certain improvements to the insect trap in U.S. Pat. No. 5,557,880, also incorporated herein by reference in its entirety. More recently, a multi-chambered trap with spaced entryways is disclosed in U.S. patent application Ser. No. 12/200,820 by the present inventor, which is also hereby incorporated by reference in its entirety.

Previously patented trap structures include a transparent, generally cylindrical entrapment chamber that is open at the bottom, and a base that attaches to the bottom of the entrapment chamber, and defines one or more entryways for the target insect. In the prior art device, the entrapment chamber also includes ventilation openings at the top end of the cylindrical entrapment chamber. The entryways in the base are apertures that permit and encourage entry into the entrapment chamber by wasps. An entry cone shaped as a truncated cone or tapered guide is disposed in the entrapment chamber. The tapered guide is open at the bottom, which is directly adjacent to the perimeter at the bottom of the entrapment chamber, and includes a smaller open aperture at the top end of the tapered guide. Wasps or other target insects enter the trap through the entryways, and fly or climb into the cone, passing through the smaller aperture in its truncated upper end. The target insect thereby becomes entrapped in the cylindrical chamber. Once the target insect is inside the chamber, exiting is highly improbable.

Insect traps may utilize one or more attractants to lure target insects into the trap. The attractant may be as simple as water, or may be a chemical attractant that is targeted to a particular species. For example, the attractant may be an olfactory attractant for the target insect. In one embodiment, the attractant is a volatile attractant formed into a solid with a polyurethane matrix, such that the attractant will evaporate and escape from the matrix over a period of time. The attractant may combine water with a volatile olfactory attractant, wherein the volatile olfactory attractant mixes with vapors from a chemical attractant and/or water in a separate container, the mixed vapors exiting the trap in a plume. An effective attractant plume will attract the target insects toward the trap, and in particular toward the trap entryway. Various attractants or combination of attractants may be used, including both solid and liquid attractants, providing great flexibility in selecting from a range and combination of attractants.

Portions of the trap may be colored and/or reflective to visually attract one or more target insects, and/or a volatile olfactory attractant may be provided to aid in attracting the target insect(s). Any such coloring and attractant may be selected to entice or attract a particular species of insect, providing a high degree of selectivity to the trap.

However, it is known that certain species of insects are territorial, and/or do not co-mingle. Members of a territorial insect species may be mutually or unilaterally antagonistic and/or repulsive toward other insect species. Sometimes mutually antagonistic species share a common environment (such as a residential yard, an orchard, a field, a wooded area, or the like) but avoid or repel each other when they come into close proximity. In such cases, conventional insect traps may be ineffective for one or more desired target species due to the close-proximity repulsion between target species.

It is believed that further improvements in trap designs for insects may be discovered by studying the social and other behaviors of the target insects, and adapting the trap design to take advantage of the insects' innate behavioral and instinctive characteristics.

There remains a need, therefore, for improvements in insect traps that are suitable for entrapping more than one species of insect.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An insect trap is disclosed that includes an entrapment chamber defining a compartment having an open end, a tapered guide that extends into the compartment, and a first entry structure that is removably attached to the open end of the compartment. The first entry structure has a plurality of entry apertures therethrough that are positioned below the tapered guide and provide insect access to the first compartment. The first entry structure includes a plurality of external fins that define barriers between the entry apertures, such that insects arriving at different entry apertures are less likely to interact with each other.

In an embodiment the first entry structure further comprises a center recess that is configured to retain an attractant.

The tapered guide may comprise a truncated cone having a smaller open top end, a larger open bottom end that is snuggly disposed in the open end of the compartment, and a plurality of apertures therethrough that provide the insects a perch. The tapered guide may include a substantially cylindrical lower portion and/or a crown structure at the smaller open end.

In an embodiment, the first entry structure further comprises a plurality of peripheral slots spaced about a periphery of the first entry structure that are positioned at a distal end of the converging channels defined by the external fins and the entry apertures are positioned at the proximal end of the converging channels.

In an embodiment, the entrapment chamber further comprises a second compartment having an open end, wherein the second compartment is separated from the first compartment, and a second entry structure providing insect access to the second compartment.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Aspects of insect traps in accordance with the present invention will now be illustrated by showing currently preferred embodiments of insect traps, and with reference to the FIGURES, wherein like numbers indicate like part.

Figure 1:
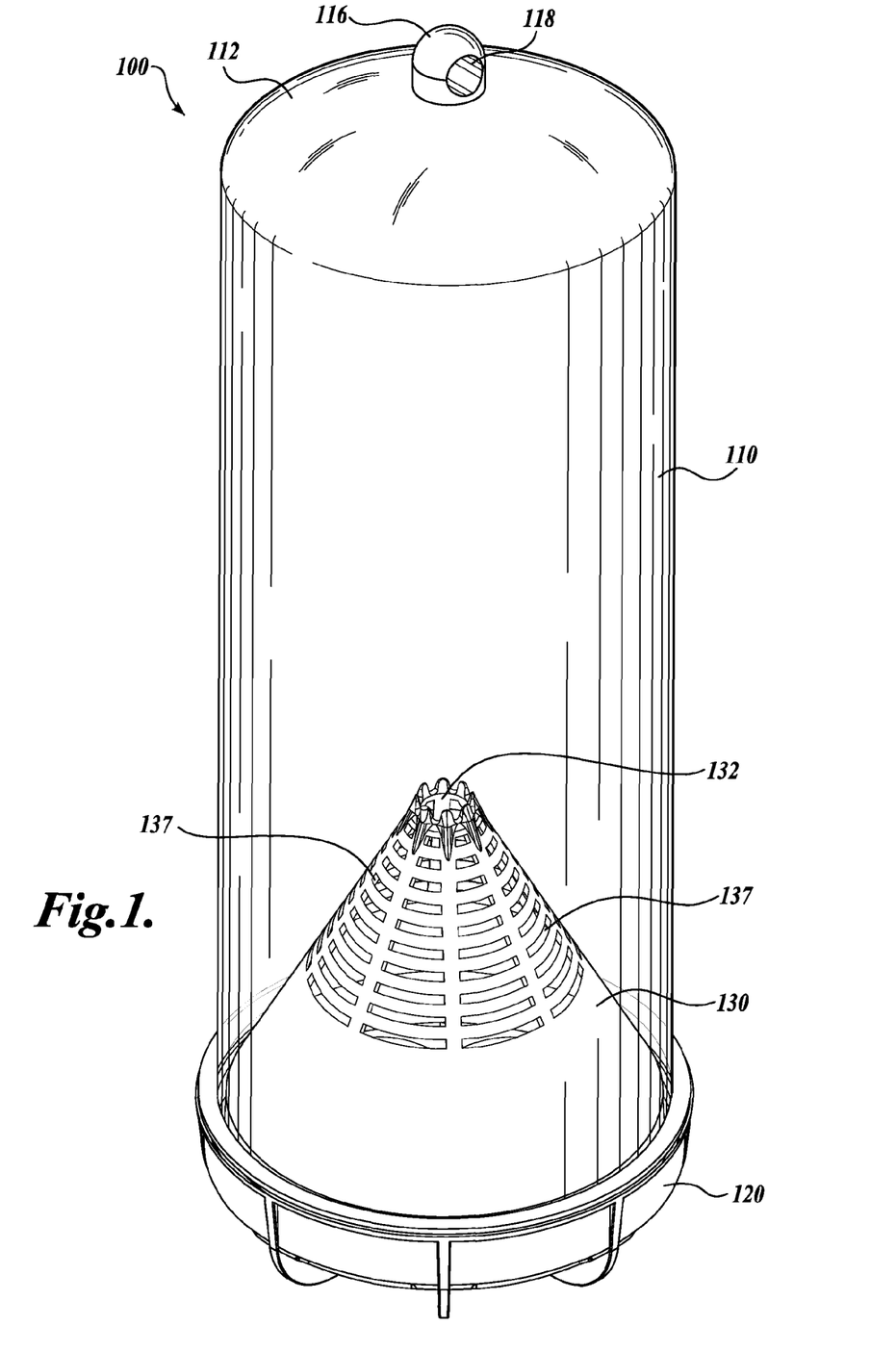
FIG. 1 is a perspective view of an insect trap in accordance with the teachings of the present invention.
Figure 2:
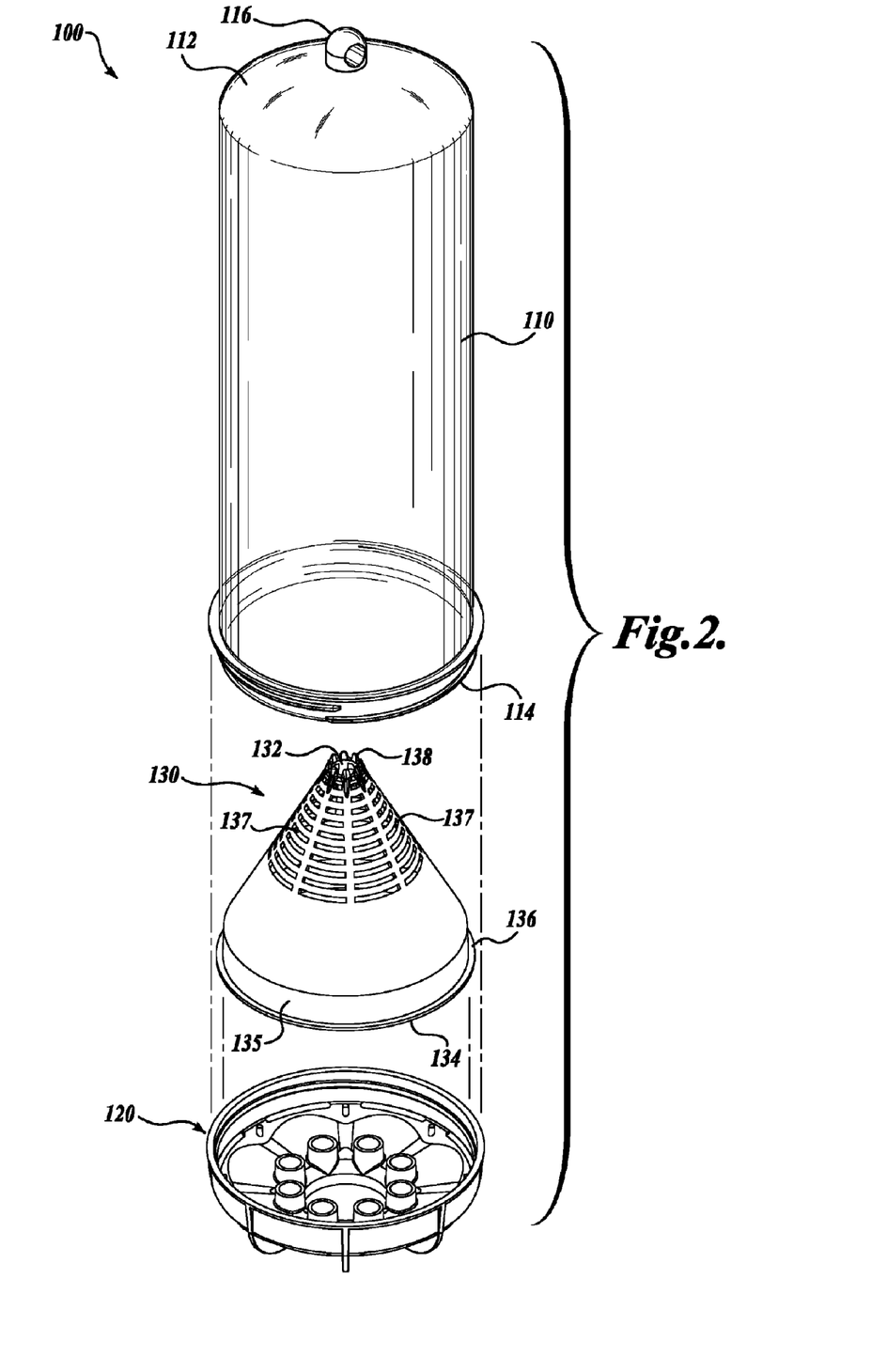
FIG. 2 is an exploded view of the insect trap shown in FIG. 1.

FIG. 1 shows a perspective view of an insect trap 100 that is suitable for trapping flying insects. Refer also to FIG. 2, which shows an exploded view of the insect trap 100. The insect trap 100 has an entrapment chamber 110 that is closed at the top 112, and open at the bottom 114. An entry structure 120 is removably attached to the entrapment chamber 110. In a current embodiment, the entry structure 120 threadably engages the lower end 114 of the entrapment chamber 110. However, it will be apparent that other attachment means are possible as are known in the art, for example utilizing a friction fit, tab and slot arrangements, external attachment members, or the like.

Although not required for the present invention, in the preferred embodiment the entrapment chamber 110 is formed generally as a transparent or translucent, circular cylinder. The color and translucence of the entrapment chamber 110 may be selected, for example, to attract a particular target insect, to deter pests or other animals that are not target insects, or to accommodate aesthetic considerations. A hanging nib 116 defining a through-aperture 118 is shown at the top of the entrapment chamber 110, to facilitate hanging the trap 100.

A tapered guide 130 extends into the entrapment chamber 110 from the open bottom end 114, and is retained therein by the entry structure 120. The tapered guide 130 is shaped generally as a truncated cone, having a smaller open top end 132, and a larger open bottom end 134. In this embodiment, the guide 130 includes a lower, generally cylindrical portion 135 sized to fit snugly in the entrapment chamber 110, and an outwardly extending annular rim 136 that abuts the bottom of the entrapment chamber 110.

The tapered guide 130 includes a plurality of apertures 137 therethrough, which in this embodiment are generally elongate, rectangular slots. The apertures 137, which are preferably disposed near an upper end of the tapered guide 130, allow light to pass through, such that in suitable lighting the upper portion of the guide will be better illuminated, providing a sense of openness, and encouraging target insects to proceed into the tapered guide 130. The apertures 137 also provide a perch for such insects.

Figure 3:
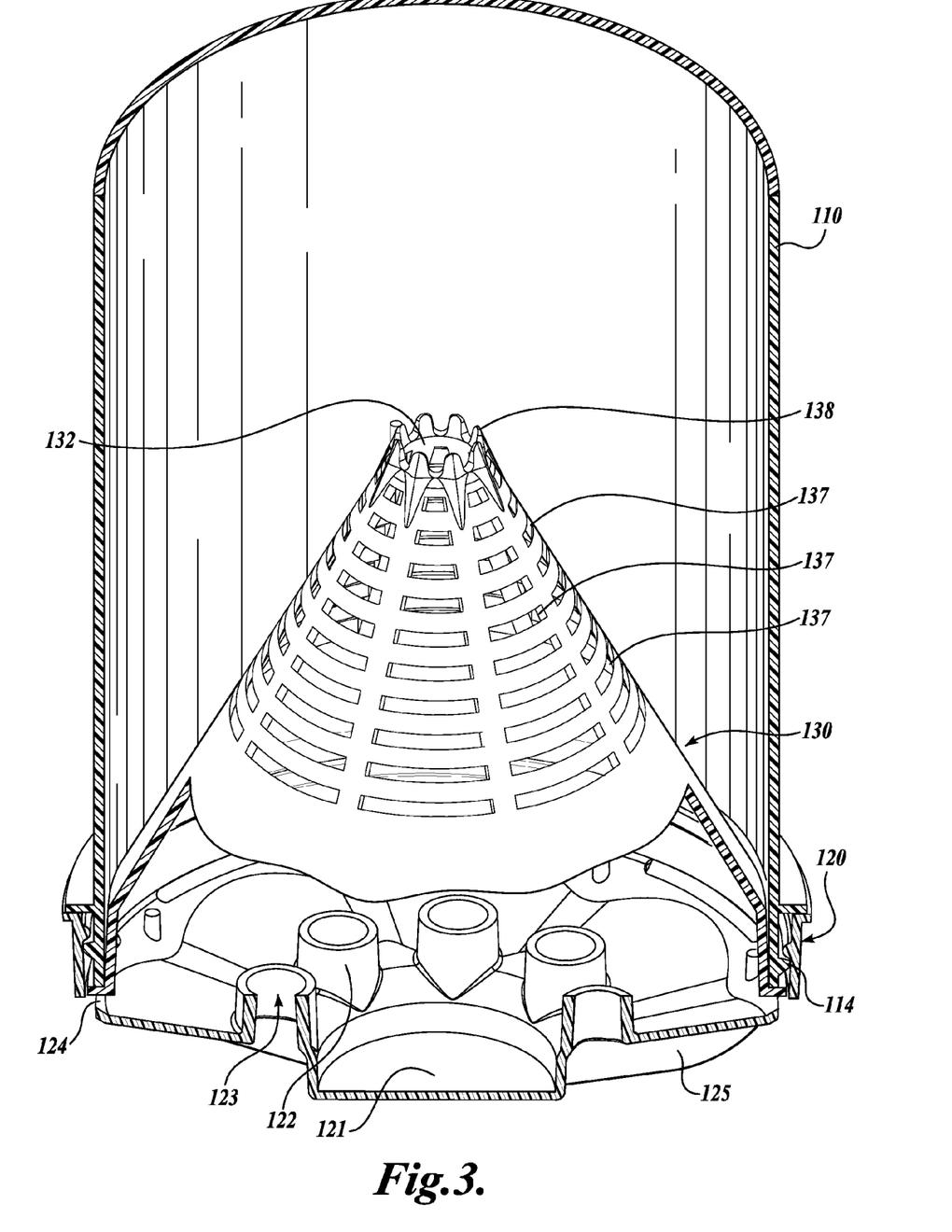
FIG. 3 is a fragmentary, detail view of a portion of the trap shown in FIG. 1, showing aspects of the lower cone structure.

FIG. 3 shows a fragmentary view of the insect trap 100, showing details of the tapered guide 130. A novel aspect of the tapered guide 130 is a crown structure 138 disposed at the open top end 132. The crown structure 138 comprises a plurality of upward extensions (eight shown) spaced circumferentially about the open top end 132. The crown structure 138 tends to discourage or inhibit insects that have entered the entrapment chamber 110 through the tapered guide 130, from re-entering the tapered guide 130 and exiting the entrapment chamber 110.

Figure 4A:
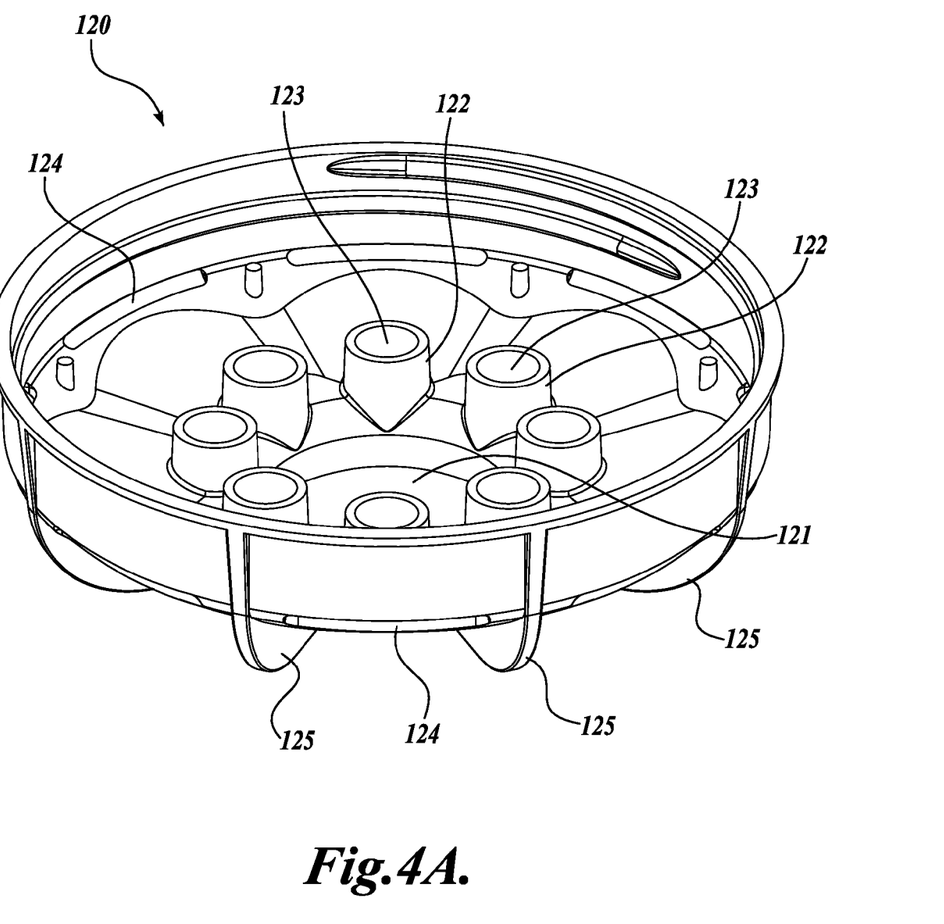
FIG. 4A is a perspective view of the entry structure in isolation for the insect trap shown in FIG. 1.
Figure 4B:
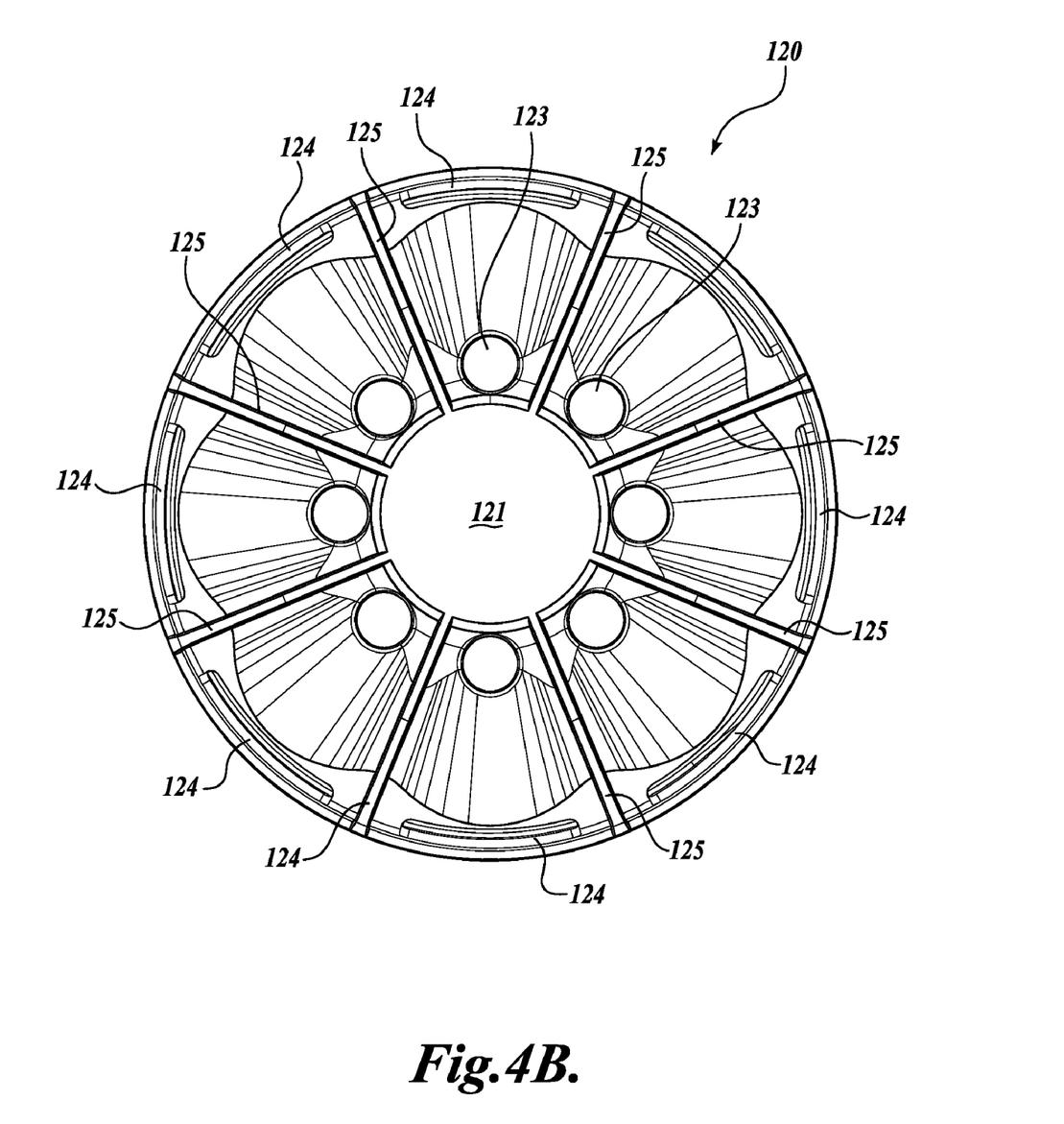
FIG. 4B is a bottom view of the entry structure for the insect trap shown in FIG. 1.

FIG. 4A is a perspective view of the entry structure 120, and FIG. 4B shows a bottom view of the entry structure 120. The entry structure 120 attaches to the entrapment chamber 110, e.g., after the tapered guide 130 has been inserted into the open lower end 114. The entry structure 120 defines a central recess 121, which may be used, for example, to support or retain an attractant (not shown) for attracting one or more targeted insects. The attractant may be in liquid or solid form, and may be as simple as water, or a more complex organic or chemical attractant. A plurality of entryways 122 are defined in the entry structure 120. In this embodiment the entryways 122 comprise apertures 123 defined by upright tubular members. A plurality of slots 124 are spaced about the perimeter of the entry structure 120. The slots 124 provide an opening that allows attractant to exit the trap 100 to form a plume. The attractant may exit the trap 100 by diffusion, by pressure driven outflow resulting from changes in temperature in the entrapment chamber 110, and/or by convection or airflow initiated by external air entering the trap 100 from one or more of the slots 124. Of course, attractant may also exit the entryway apertures 123, wherein attractant from an entryway aperture 123 and slot 124 may cooperatively form the plume. The attractant plume tends to urge the target insects toward the trap 100, and specifically toward the trap entryways 122.

As seen most clearly from comparing FIG. 4A and FIG. 4B, the bottom of the entry structure 120 defines a plurality of panels or fins 125 comprising radially oriented walls extending from the central recess structure 121 to the periphery of the entry structure 120. The fins 125 define a plurality of converging channels, each channel leading to one of the entryway apertures 123. The fins 125 are substantially planar, upright walls, although other configurations are clearly possible. The fins 125 provide several advantages. For example, the fins 125 separate neighboring entryway apertures 123, thereby reducing the opportunity for multiple insects arriving at the same time from interacting with each other. This allows the entryway apertures 123 to be located closer together without increasing insect interference. The fins 125 also guide the insects toward the aperture 123, thereby tending to encourage target insects to enter the trap through the entry aperture 123. Also, the fins 125 tend to guide and retain the attractant plume, to better entice the target insects into the trap 100.

Figure 5:
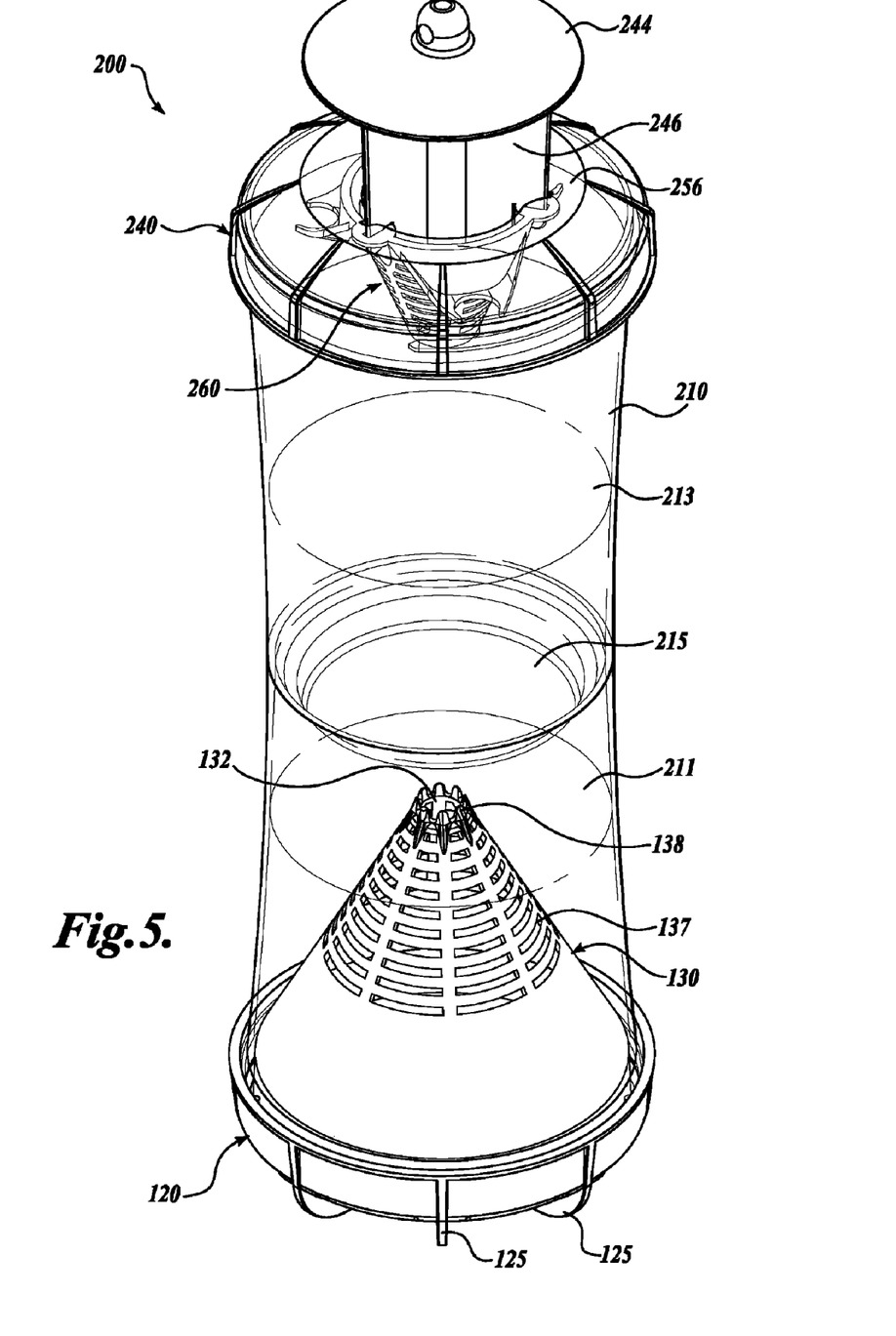
FIG. 5 is a perspective view of a second embodiment of an insect trap in accordance with the teachings of the present invention.
Figure 6:
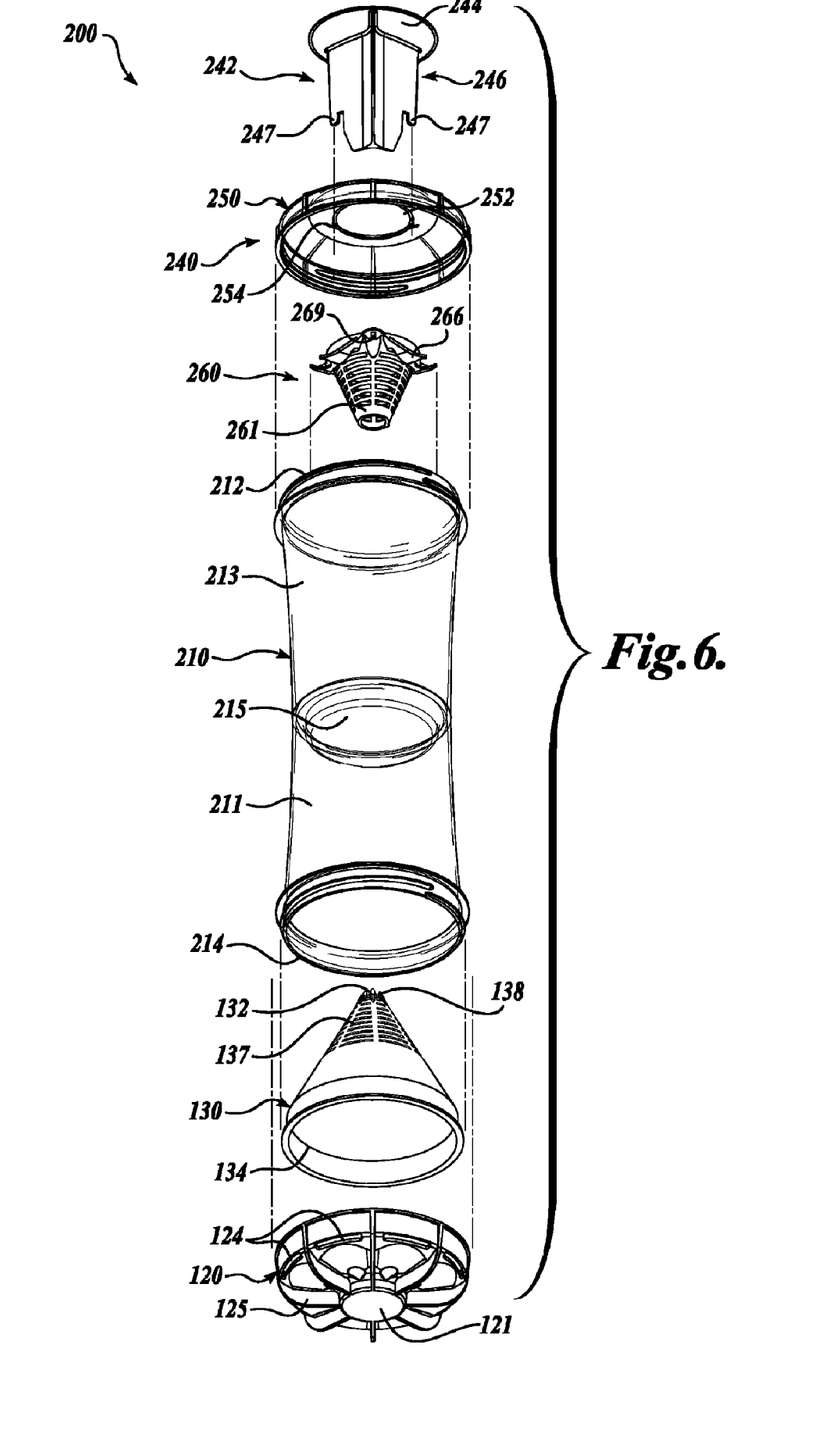
FIG. 6 is an exploded view of the insect trap shown in FIG. 5.
Figure 7:
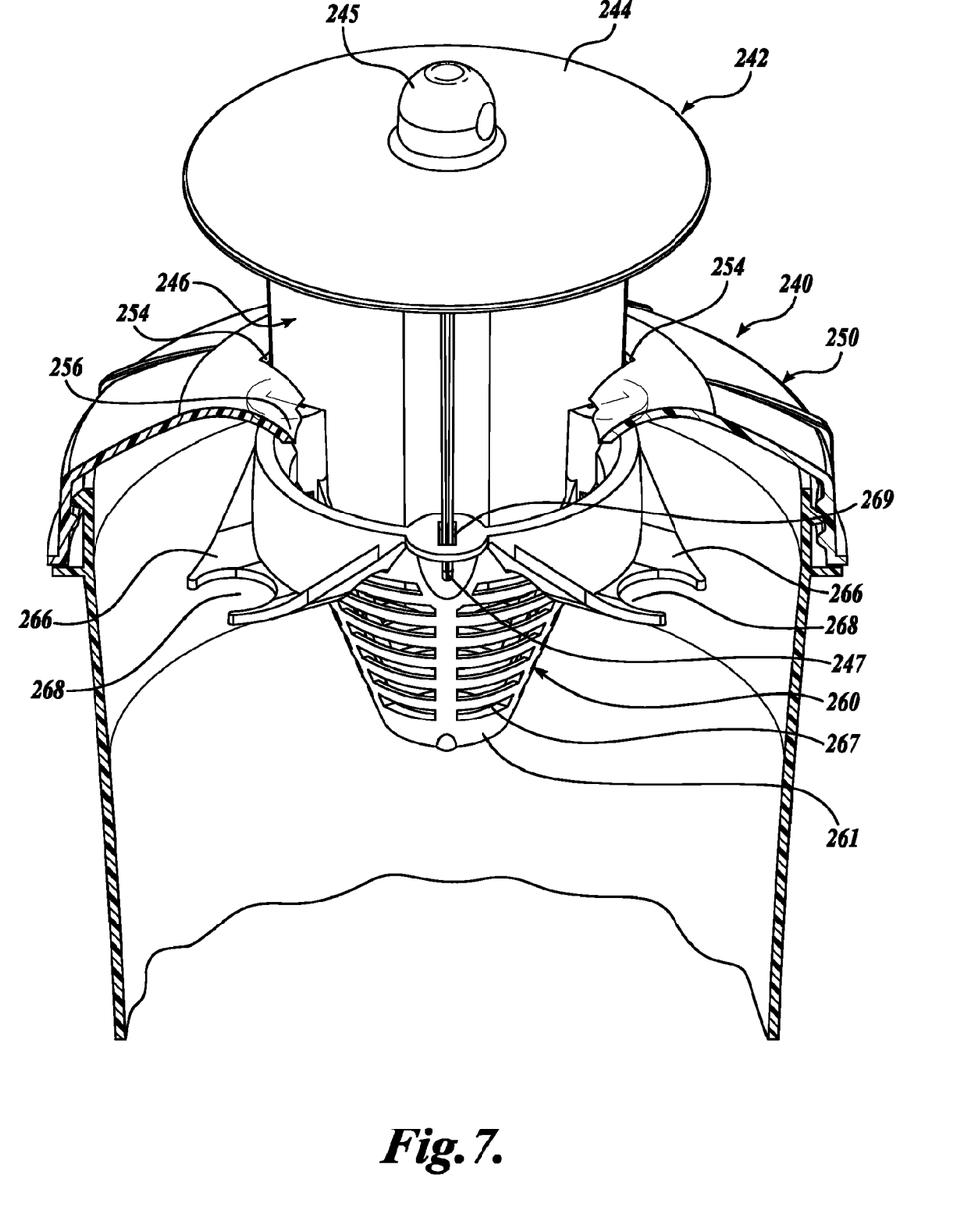
FIG. 7 is a fragmentary, detail view of a portion of the trap shown in FIG. 5, showing aspects of the upper structure.

A second embodiment of an insect trap 200 in accordance with the present invention is shown in FIGS. 5-7. FIG. 5 shows a perspective view of the insect trap 200, FIG. 6 shows an exploded view of the insect trap 200, and FIG. 7 shows a detail view showing a second entry structure 240. Certain aspects of this embodiment of the trap 200 are similar to corresponding aspects of trap 100 discussed above with reference to FIGS. 1-4B. Generally, where similar elements are shown, the identifiers are the same. Similar aspects will not be described again for clarity and brevity.

Also, the insect trap 200 shares many aspects with the insect traps disclosed and illustrated in the applicant's co-pending U.S. patent application Ser. No. 12/200,820 filed on Aug. 28, 2008, which is hereby incorporated by reference in its entirety.

As shown in FIGS. 5 and 6, the insect trap 200 includes an entrapment chamber 210 having multiple, separate compartments. In this embodiment a lower first compartment 211 is separated from a second compartment 213 by a transverse wall 215. It is contemplated by the present invention that more than two compartments may alternatively be provided. The entrapment chamber 210 is preferably transparent or semi-transparent, although it is contemplated that for some target species an opaque entrapment chamber may be preferred.

A first entry structure 120 is removably attached to a lower end 214 of the entrapment chamber 210, providing insect access to the first compartment 211. The first entry structure 120 is discussed above. In particular, the first entry structure 120 includes a plurality of entryways 122 providing access to the first compartment 211, a central recess 121 that may be used to retain an attractant, a plurality of circumferential slots 124, and a plurality of fins 125 that in the current embodiment are generally radially oriented to define converging channels leading to a corresponding entryway 122.

A tapered guide 130 is removably disposed in the first compartment 211. The tapered guide 130 is described above, and includes an open top end 132 with a crown structure 138 to deter insect egress, an open bottom end 134, and a plurality of apertures 137 through a conical portion of the tapered guide 130. The entrapment chamber transverse wall 215 is located above and spaced away from the top end of the tapered guide 130.

The entrapment chamber 210 has a second open end 212 that provides access to the second compartment 213, and is adapted or configured to receive a second entry structure 240. The second entry structure 240 includes an attachment fixture 242, an annular lid 250, and a tapered guide 260. A detail, partially cutaway view showing the second entry structure is shown in FIG. 7.

The lid 250 releasably engages the upper end 212 of the entrapment chamber 210, for example by threadable engagement, friction fit or any other suitable attachment. The lid 250, which may be at least partially transparent to allow ambient light into the trap 200, includes a center aperture 252 and a plurality of short, radial slots 254. In this embodiment, the aperture 252 is defined by a downwardly curving lip portion 256, to further facilitate target insects entering the trap 200.

The attachment fixture 242 includes an upper cap 244 having an optional hanging nib 245 to facilitate hanging the trap 200. A divider 246 extends downwardly from the cap 244 defining a plurality of radial panels (three shown) that are sized and positioned to slidably engage the short slots 254 in the lid 250.

As seen most clearly in FIG. 6, the divider 246 includes a plurality of tabs 247 that engage corresponding apertures 269 in the tapered guide 260. To assemble the second entry structure, the divider 246 extends through the slits 254 in the lid 250, and the tabs 247 engage apertures 269 in the tapered guide 260.

As seen most clearly in FIG. 7, the tapered guide 260 includes a truncated conic portion 261 having a smaller open end 262, a larger open end 264, and a plurality of spaced apertures 267. The larger open end 264 of the guide 260 is sized to fit around or receive a portion of the curved lip 256 of the lid 250. Wing members 266 extend from near the top of the tapered guide 260, defining a plurality of apertures or openings 268. The openings 268 may be used to hold vials of attractant (not shown), or the like.

The divider 246 includes a distal portion that extends a distance into the conic portion 261, and is shaped to approximately conform to the inner surface of the conic portion. The divider 246 and tapered guide 260, therefore, cooperatively define three entryways into the second compartment 213 that are effectively isolated from each other. The separate entryways separate target insects arriving at different entryways, such that the insects are unlikely to interact or interfere with each other. Of course, the particular number of entryways is a matter of design choice, and fewer than three, or more than three entryways are contemplated.

It is contemplated that in use, one or more attractants may be retained by the wing members 266, producing one or more plumes of attractant that emanate from the second entry structure 240. It is believed that at a distance the plumes from the second entry structure 240 are likely to merge, producing a relatively strong plume to attract target insects. Near the second entry structure 240, the plumes should remain separated, such that target insects will be attracted to one of the entryways, thereby allowing multiple insects to access the trap 200 without substantially interfering with each other.

Similarly, an attractant may be provided in the first entry structure 120, such that plural insects may simultaneously be trapped in the first compartment 211 without, or with minimal, mutual interference.

By improving the efficiency of the insect traps the number of traps required to achieve a desired level of efficacy will be reduced.

In the present embodiment, the attachment fixture 242 and tapered guide 260 are attached to each other and slidably engage the lid 250. This conveniently allows the second entry structure 240 to be closed by sliding the attachment fixture downwardly such that the cap portion 244 closes the lid center aperture 252. This facilitates packaging and shipping of the trap 200, for example. It will be appreciated, and it is contemplated herein, that a crown structure may be provided on the smaller open end 262 of the tapered guide 260, similar to the crown structure 138 described above, to discourage insect egress from the second compartment 213.

While illustrative embodiments have been illustrated and described, it will be appreciated that various changes can be made therein without departing from the spirit and scope of the invention.

The embodiments of the invention in which an exclusive property or privilege is claimed are defined as follows:

1. An insect trap comprising:
   an entrapment chamber comprising a first compartment having an open end;
   a tapered guide that extends into the first compartment;
   a first entry structure that is removably attached to the open end of the first compartment, the first entry structure having a plurality of entry apertures therethrough that are positioned below the tapered guide and provide insect access to the first compartment, and a central recess that protrudes from the entry structure;

wherein the first entry structure further comprises a plurality of external fins defining converging channels, the fins abutting the central recess such that the fins and protruding central recess define barriers separating the plurality of entry apertures from each other such that insects at different entry apertures are deterred from interacting with each other.

2. The insect trap of claim 1, wherein the tapered guide comprises a truncated cone having a smaller open top end and a larger open bottom end, the truncated cone having a plurality of apertures therethrough.

3. The insect trap of claim 2, wherein the tapered guide further comprises a cylindrical lower portion that is sized to snugly fit in the open end of the first compartment.

4. The insect trap of claim 2, wherein the tapered guide further comprises a crown structure at the open top end.

5. The insect trap of claim 1, wherein the first entry structure further comprises a plurality of peripheral slots spaced about a periphery of the first entry structure.

6. The insect trap of claim 5, wherein the slots are positioned at a distal end of the converging channels defined by the external fins and the entry apertures are positioned at the proximal end of the converging channels.

7. The insect trap of claim 1, wherein the entrapment chamber further comprises a second compartment having an open end, wherein the second compartment is separated from the first compartment, the insect trap further comprising a second entry structure providing insect access to the second compartment.

8. The insect trap of claim 7, wherein the second entry structure comprises a plurality of separated entryways into the second compartment.

9. The insect trap of claim 7, wherein the second entry structure comprises an annular lid portion that is releasably attachable to the open end of the second compartment, a tapered guide that extends into the second compartment, and a divider that extends through the lid portion and engages the tapered guide.

10. The insect trap of claim 9, wherein the second entry structure further comprises a plurality of wing portions that extend into the second compartment, the wing portions defining recesses sized and configured to retain an insect attractant.

11. The insect trap of claim 9, wherein the annular lid portion comprises a plurality of slots that are sized and shaped to slidably receive the divider, and further wherein the divider is attached to the tapered guide.

12. The insect trap of claim 11, wherein the second entry structure further comprises a cap that is attached to the divider, the cap having a hanging nib.

13. An insect trap with multiple, separated entryways comprising:
an entrapment chamber defining a first compartment having an open end, and a second compartment having an open end;
a first tapered guide having a smaller opening that extends into the first compartment, and a larger opening disposed at the first compartment open end, the smaller opening having a plurality of circumferentially spaced projections extending upwardly from the smaller opening;
a first entry structure attached to the first compartment open end, the first entry structure defining a plurality of entry apertures therethrough providing access to the first compartment, a central recess that protrudes from the entry structure, and a plurality of fins abutting the central recess and separating the entry apertures, wherein the central recess and plurality of fins separate the plurality of entry apertures from each other such that insects at different entry apertures are deterred from interacting with each other;
a second tapered guide having a smaller opening that extends into the second compartment and a larger opening;
a second entry structure attached to the second compartment open end, the second entry structure comprising an annular lid and a divider that extends through the annular lid defining a plurality of separated entryways into the second compartment.

14. The insect trap of claim 13, wherein the central recess is configured for retaining an attractant.

15. The insect trap of claim 13, wherein the plurality of fins define converging channels, each converging channel leading to one of the plurality of entry apertures.

16. The insect trap of claim 13, wherein the first tapered guide further comprises a cylindrical lower portion that is sized to snugly fit in the open end of the first compartment.

17. The insect trap of claim 15, wherein the first entry structure further comprises a plurality of peripheral slots spaced about a periphery of the first entry structure.

18. The insect trap of claim 17, wherein the slots are positioned at a distal end of the converging channels defined by the fins and the entry apertures are positioned at the proximal end of the converging channels.

19. The insect trap of claim 13, wherein the second entry structure further comprises a plurality of wing portions that extend into the second compartment, the wing portions defining recesses sized and configured to retain an insect attractant.

* * * * *